Patented Dec. 16, 1930

1,785,053

UNITED STATES PATENT OFFICE

CLEMENT K. STODDER, OF BROOKLINE, MASSACHUSETTS

FILLING AND BINDING COMPOSITION

No Drawing.   Application filed April 15, 1929. Serial No. 355,426.

This invention relates to improvements in filling and binding compositions for general usage, and the principal object is to provide a composition in the form of a powder containing and requiring no readily flammable ingredients and which can be formed by the addition of water into a quick-setting plastic.

One of the objects of the invention is to provide a filler and binder of the character specified which, when set, will be of a non-brittle tenacious character capable of being readily worked as by sawing, cutting, planing, or grinding, and which is capable of being readily surfaced and polished.

Another object of the invention is to provide a filling and binding composition which, while hard, will be of such consistency and tenacity as to permit nails to be driven into it without cracking the material and which will "hold" the nail firmly.

Fillers of granular composition are widely used in carpentry, cabinet making, and the like, to fill cracks, holes, nail holes, and other recesses in wood, and other fibrous material, and another object of the invention is to provide a filling which is capable, when set, not only of being surfaced by usual tools and machine, but which may be stained and polished or painted closely to resemble the enclosing or adjacent fibrous material.

Another object of the invention is to provide a filling and binding composition which when set, particularly under pressure, will be non-shrinking and strongly adhesive to the materials which contact with it, whether fibrous or metallic, and therefore adapted to seal and cement joints not only of wood, and other fibrous materials, but also joints between metal parts including pipe joints and the like.

Another feature of the invention is to provide a filler of the character described which, when set, is substantially insoluble.

Another object of the invention is to provide a powdered composition comprising calcined gypsum having homogeneously intermingled therewith such proportion of a chemically inert filler having water-absorbing properties that when the powdered composition is thoroughly moistened sufficient moisture will be retained by the filler throughout the mass to insure complete hydration of the anhydrous calcium salt.

These and other objects and features of the invention are attained by providing a homogeneous mixture of finely powdered calcined gypsum (plaster of Paris) and finely powdered adhesive, preferably of vegetable origin, and a chemically inert filler having water-absorbent properties in proper proportions to produce the desired result.

Calcined gypsum (plaster of Paris) of a high grade, is finely ground and graded preferably by passing through a screen of at least one hundred mesh per square inch, or finer. A suitable chemically inert filter having water-absorbent properties is used in powdered form and desirably is of a fineness also to pass through the screen of one hundred mesh per square inch.

While such materials as infuscrial earth, Fuller's earth, tripoli, and the like, having water-absorbent properties may be used as a filler, preferably volcanic ash finely pulverized to pass through a screen of at least one hundred mesh per square inch, is employed as it is free from crystallization, highly absorbent of water, and of a light or neutral color, and readily capable of receiving and retaining a stain.

A soluble adhesive in powdered form of a fineness to pass through a screen of one hundred mesh, or finer, is employed. Preferably the adhesive is of vegetable origin and desirably a derivative of starch. I have found that dextrine is particularly adapted for the purpose because of its tenacious adherence, when moistened and dry, to the minute granules of the calcium salt, and the filler. If desired, coloring matter may be added in such quantities as may be desired. Powdered sienna, or powdered burnt sienna, is particularly adapted for such purpose as it is a clay composition which also acts in part as a filler.

The ingredients above mentioned may be mixed in any suitable proportions comprising relatively small amounts of filler and adhesive. I have found that a very satisfactory composition is produced by the mixture of the following ingredients in approximately the proportions stated:—

| | Parts |
|---|---|
| Calcined gypsum (plaster of Paris) | 32 |
| Dextrine | 4 |
| Volcanic ash | 4 |

If desired any suitable coloring matter may be added, but for general purposes I find that burnt sienna in the proportion of one part to the above proportions of ingredients gives satisfactory color and results, as it modifies the color of the mixture from approximately white to a light buff color which blends more readily with usual wood work, and aids in producing substantially the same color when stained concurrently with the staining of the adjacent or enclosing wood.

The powdered ingredients may be mixed in any suitable manner, either before or after screening. Preferably a mixing machine is employed which will thoroughly intermingle the ingredients to produce a homogeneous mixture. Inasmuch as the specific gravities of the several ingredients employed are quite nearly the same, no stratification will take place after the mixing operation is completed.

The homogeneous composition thus produced when packed in a dry atmosphere in hermetically sealed containers can be kept indefinitely without deterioration. If the packages are promptly closed after having been opened to remove a portion of the contents, the remainder will not be seriously affected by absorption of moisture from the air if the package is kept thereafter in a reasonably dry atmosphere.

The powdered composition embodying the invention can be economically produced and may be used for various purposes in addition to those above mentioned. It is well adapted to produce casts as the plastic composition does not shrink when setting. It is particularly useful in sculpture as when in a plastic state it can be readily moulded and after setting can be cut by a knife, chisel, or other tool, without the likelihood of chipping or fracture. It is especially adapted for use as a patching plaster.

When employed in wood work it offers about the same resistance to sawing, planing, or cutting, as soft wood such as pine or white wood and when surfaced, stained and polished presents substantially the same appearance as the grain of the adjacent wood.

It is non-conductive of electricity and, therefore, adapted for use in insulating electrical wires and joints.

In view of the insolubility in water when set it may also be employed for caulking boats, filling cracks in floors and various other uses in many different arts.

In fact, the composition may be said to be of practically universal use.

Having thus described the invention, what is claimed as new, and desired to be secured by Letters Patent, is:

1. A powdered filling and binding composition consisting of a major portion of calcined gypsum and substantially minor, approximately equal, portions of dextrine and a chemically inert filler having water-absorbent properties homogeneously intermingled in such proportions as to produce, when thoroughly moistened, a plastic mass which will set without shrinking and which when set is hard, tenacious and readily penetrable by driven nails without breakage or cracking.

2. A powdered filling and binding composition consisting of a major portion of calcined gypsum and minor portions, approximately ten per cent, each, of dextrine and a chemically inert filler having water-absorbent properties homogeneously intermingled and in such proportions as to produce when thoroughly moistened a plastic mass which will set without shrinking and which when set is hard, tenacious and non-brittle and capable of being readily surfaced, stained, and polished to simulate adjacent or enclosing fibrous material.

3. A powdered filling and binding composition comprising the following ingredients in substantially the following proportions:—

| | Parts |
|---|---|
| Calcined gypsum (plaster of Paris) | 32 |
| Dextrine | 4 |
| Volcanic ash | 4 |

In testimony whereof, I have signed my name to this specification.

CLEMENT K. STODDER.